March 27, 1962   T. C. FLETCHER ET AL   3,027,079
DATA HANDLING SYSTEM
Filed March 4, 1957
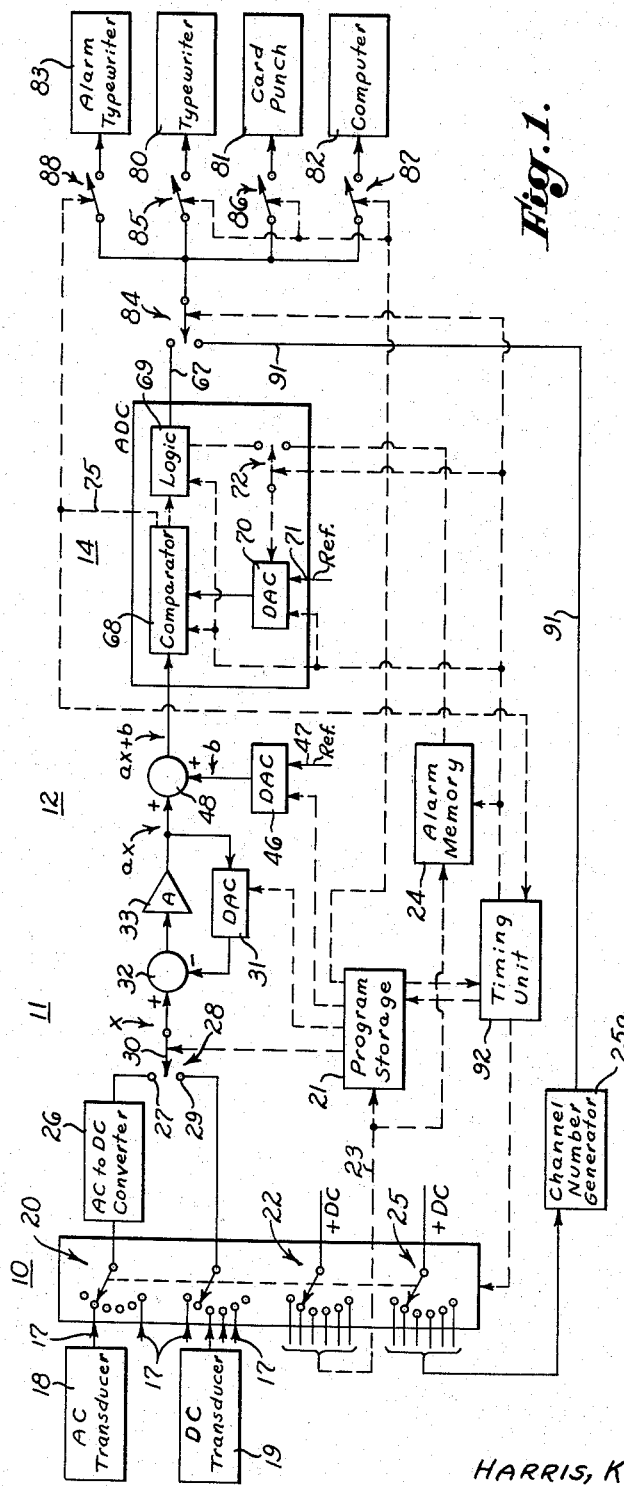
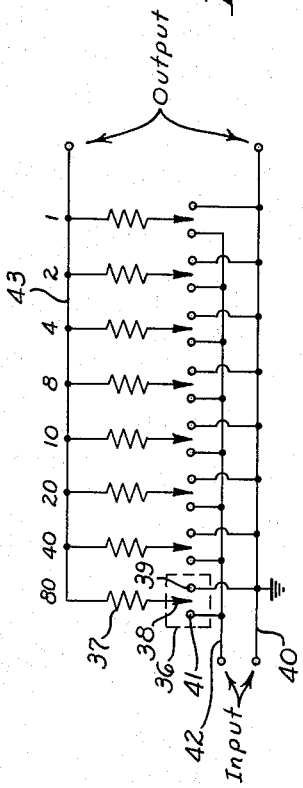
INVENTORS.
TAYLOR C. FLETCHER
LAWRENCE M. SILVA
BY THEIR ATTORNEYS.
HARRIS, KIECH, FOSTER & HARRIS United States Patent Office 3,027,079
Patented Mar. 27, 1962

3,027,079
DATA HANDLING SYSTEM
Taylor C. Fletcher and Lawrence M. Silva, Fullerton, Calif., assignors to Beckman Instruments, Inc., Fullerton, Calif., a corporation of California
Filed Mar. 4, 1957, Ser. No. 643,604
13 Claims. (Cl. 235—154)

This invention relates to data handling systems.

The basic purpose of a data handling system is to collect and preserve the information produced by a large number of status sensing devices such as thermocouples, pressure gauges, flow meters, accelerometers, strain gages and the like. Such status sensing devices are usually designed to produce an electrical voltage which is a function of the quantity being measured and are generally referred to as transducers. A data handling system will collect information from a plurality of transducers, sampling or reading each individual transducer as often as desired, and will convert the voltages from the transducers to numbers readable directly in the quantity being measured, i.e., 10 pounds, 107°, 15 gallons per minute, or 3 millivolts. This digital information will be presented in a form suitable for use by a computer and/or a logging device such as a typewriter, a card punch or the like. The output of such a data handling system may also be used to initiate corrective control in automatic control systems.

It is desirable that such a data handling system provide for modification of the voltage signal obtained from a transducer in accordance with the characteristic of the particular transducer so that the output data may be read directly without reference to calibration curves or the like. Such modification should include a scale factor and a correction for offset from zero. A further purpose of a data handling system is to provide control or alarm indication when outputs from individual transducers depart from predetermined limits, such limits being set directly in the quantities being measured rather than in electrical voltages.

Accordingly, it is an object of this invention to provide a method of handling data in the manner described above. Another object of the invention is to provide apparatus for handling data in the manner described above. It is a further object of the invention to provide such methods and apparatus for handling data in analog form from a plurality of sources to provide the data singly, in a controlled sequence and in digital form to one or more of a plurality of output devices.

It is another object of the invention to provide methods and apparatus for data handling in which the control information, such as sampling sequence, scale factor, zero offset, alarm limits and the like may be stored in digital form in a memory. A further object of the invention is to provide such a data handling system in which the operations carried out in the system are under the integrated control of the memory so that as a transducer is sampled, all the system parameters are set up for the operations associated with the particular transducer.

It is another object of the invention to provide a data handling system in which the scale factor of the transducer is introduced by controlling the gain of an amplifier and in which the zero offset of the transducer is introduced by adding a predetermined voltage to the amplifier output. A further object of the invention is to provide such a system having a digitally controlled voltage attenuator in the feed-back loop of the amplifier for gain control and having a digitally controlled voltage attenuator to modify a reference voltage for use as the added voltage.

Other objects of the invention as well as novel details of construction and novel combinations and arrangements of parts will more fully appear in the course of the following description. The drawing merely shows and the description merely describes a preferred embodiment of the present invention which is given by way of illustration or example. In the drawing:

FIG. 1 is a block diagram of a preferred embodiment of the invention; and

FIG. 2 is a schematic diagram of a digitally controlled attenuator suitable for use in the embodiment of FIG. 1.

The embodiment of the invention shown in FIG. 1 includes an input switching mechanism 10, a variable gain amplifier 11, a summing device 12 for combining the output of amplifier 11 with other outputs, and an analog-to-digital converter 14, the alarm circuitry being integrated with the analog-to-digital converter in this embodiment. The diagram of FIG. 1 is a single line diagram with control paths being indicated by dashed lines. While this embodiment contains components for carrying out all of the data handling operations discussed above, it is understood that whenever a particular operation is not required, the associated components may be omitted from the data handling system.

A plurality of signal input terminals 17 is provided on the switching mechanism 10, the input terminals being in two groups, one adapted for use with transducers producing A.C. signals, such as the transducer 18, and the other group adapted for use with transducers producing D.C. signals, such as the transducer 19.

The input switching mechanism serves to connect the outputs from a plurality of transducers to the input of the amplifier 11 one at a time and in a particular sequence. The switching mechanism may comprise a set of relays, vacuum tube or transistor switching circuits, or other suitable circuitry and in the embodiment shown in FIG. 1, a rotary stepping switch 20 is used. The rotary switch 20 provides for six input terminals; however, it is understood that any number of inputs may be utilized, one embodiment of the present invention providing for four hundred separate signal inputs. The sequence of operation of the input switching mechanism 10 may be built in the unit or may be controlled from an outside source, such as from a program storage 21.

A means for generating a signal indicating the particular signal input terminal to which the switching mechanism is connected is associated with the switching mechanism, with the signal so generated being utilized to actuate the program storage 21 and an alarm memory 24. In the embodiment of FIG. 1, this signal is generated by a set of contacts 22 mounted on the rotary stepping switch providing a D.C. voltage to the program storage 21 through a conductor in a cable 23 connecting the contacts to the program storage, each of the contacts of the set corresponding to one of the signal input terminals respectively. With a different type of input switching mechanism, such as the bank of relays previously referred to, the sequencing mechanism which energizes the relays may also be used to supply the voltage signals to the program storage.

Another set of contacts 25 is provided in the input switching mechanism 10 for energizing a channel number generator 25a which produces a digital number for identifying each transducer input. Thus when the switching mechanism is in position 2 as shown in FIG. 1, the generator 25a will be energized through the wire connected to the second contact and will produce a digital output which the various output devices interpret as channel or transducer input 2. In practice, several hundred inputs are applied to such a system and correspondingly more contacts are required to generate the three digit identification numbers.

An A.C. to D.C. converter 26 is connected between the moving arm of the bank of the rotary stepping switch which is connected to the A.C. transducers and a fixed contact 27 of a switch 28, the moving arm of the bank of the rotary stepping switch which is connected to the D.C. transducers being connected directly to another fixed contact 29 of the switch 28. A moving contact 30 of the switch 28 serves as the input to the variable gain amplifier 11, the input being designated as $x$ which corresponds to the signal produced by the D.C. transducer coupled thereto and to the D.C. equivalent of the signal produced by the A.C. transducer coupled thereto. The switch 28 may be operated from the program storage 21, the moving contact being switched to the fixed contact 27 when an A.C. transducer is being sampled and to the fixed contact 29 when a D.C. transducer is being sampled.

The program storage 21 may be a conventional memory unit having provisions for storing information indicating the operations which are to be performed on each signal connected to the signal input terminals. This device may be any storage device, such as a relay storage, a selector switch, a combination of selector switches and relays, a magnetic disc or drum, or a hand-operated pinboard in which the execution of certain commands depends on the presence or absence of pins in a matrix of female connectors. Numerous examples of such storage devices are disclosed and described in chapter 14 of the book entitled "High Speed Computing Devices" prepared by the staff of Engineering Research Associates, Inc. and published by McGraw-Hill Book Company, Inc. in 1950. The program storage 21 will also include means for transferring the stored information relating to a particular signal source to the various components of the data handling system upon receipt of the command from the input switching mechanism 10 indicating which particular signal source or transducer is being sampled. For example, information will be stored in the program storage 21 indicating: whether a particular signal source produces an A.C. or D.C. output; the scaler constant $a$ which must be utilized in the variable gain amplifier 11; and other factors which will be discussed infra.

The analog-to-digital converter 14 generates a digital number whose magnitude is proportional to the magnitude of the input voltage applied to the converter. In the data handling system of the invention it is desired to have this numerical output read directly in the quantity being measured. Therefore, the electrical voltage from the transducer must be modified in accordance with the characteristic or, as it is sometimes described, the calibration curve, of the transducer prior to coupling this voltage to the input of the analog-to-digital converter. This operation may be expressed by the equation $y = ax + b$, where $x$ is the output voltage of a transducer for a particular status sensed by the transducer such as six millivolts for 8.2 pounds per square inch pressure, $y$ is the magnitude of voltage required at the input of the analog-to-digital converter to produce a numerical output of 8.2 and $a$ and $b$ are the parameters of the linear calibration curve of the transducer, $a$ being representative of the slope of the curve and $b$ being representative of the zero offset of the curve. The values of $a$ and $b$ will vary for each transducer and numbers representative of these values will be stored in the program storage.

In the data handling system of the invention, the voltage $x$ from the transducer is first amplified by the factor $a$ in the variable gain amplifier 11 and then a voltage $b$, which is positive or negative depending upon the direction of zero offset, is added to the output $ax$ of the amplifier to produce the resultant voltage $ax + b$. This resultant voltage may be coupled directly to the analog-to-digital converter for conversion to digital form and read out to the logging apparatus or, if desired, further operations may be performed on this voltage.

The gain of the amplifier 11 is precisely controlled and is changed to correspond with the particular signal input being sampled by the input switching mechanism, such change in gain being under the control of the information from the program storage 21. In the embodiment of the invention shown in FIG. 1, a feed-back amplifier with means for controlling the amount of voltage fed back is used. A preferred form for the feed-back circuit includes a digital-to-analog converter 31 having the output $ax$ of the amplifier as the reference voltage and being operated as a digitally controlled attenuator to provide a portion of the reference voltage as the feed-back voltage supplied to a summing device 32 which combines the feed-back voltage in negative relation with the signal voltage $x$ for use as the input to an amplifier 33, the setting of the attenuator in the digital-to-analog converter 31 being controlled by the information received from the program storage 21.

One form of a digitally controlled attenuator is illustrated in FIG. 2 where eight relays 36 each have a resistor 37 connected to a moving contact 38 of the relay. One fixed contact 39 of each of the relays is connected to a common or ground line 40 and another fixed contact 41 of each of the relays is connected to an input line 42. The other end of each of the resistors 37 is connected to an output line 43. The reciprocals of the resistances of the resistors 37 are in the ratios of the numbers written above them. When the moving contacts of all the relays are switched to the right, the output voltage is zero. When a relay is switched to the opposite contact, a voltage is produced at the output proportional to the number written above the relay, the embodiment shown in FIG. 2 providing for division of the input into one hundred steps. Of course, any number of steps may be provided by increasing the number of relays and resistors connected in parallel.

The particular relays which are energized to provide a particular portion of the amplifier output voltage as a feed-back voltage are determined by the information stored in the program storage 21 and for ease of operation of the data handling system, this information is preferably stored in digital form. For example, if $a$ should be 22 for a particular transducer, the number 22 will be introduced into the program storage so that the particular relays in the digital-to-analog converter 31 corresponding to a gain of 22 will be energized when the input switching mechanism 10 is coupled to that particular transducer.

The voltage $b$ which may be used to provide the correction for zero offset is generated in a digital-to-analog converter 46 having a fixed reference voltage supplied thereto at an input 47, the converter 46 operating as a digitally controlled attenuator under the command of the information stored in the program storage 21 to supply a particular portion of the reference voltage as the output voltage $b$. The voltages $ax$ and $b$ are added in a summing device 48 to provide the desired voltage $ax + b$ for conversion to digital form or for further computation as desired.

The output from the summing device 48 is fed to the analog-to-digital converter 14 and the output of the data handling system appears in digital form at the line 67 for subsequent use, such as computer operation or recording on suitable equipment.

The particular type of analog-to-digital converter used is not critical to the operation of the data handling system of the invention; however, a preferred form of such a converter is shown in FIG. 1 including a comparator 68, a logic unit 69 and a digital-to-analog converter 70. Such analog-to-digital converters are well known in the art. Examples of some commercially available converters are described in an article entitled "High-Speed Digital Conversion" written by M. L. Klein et al. and published in the July 1956, issue of Instruments & Automation. The digital-to-analog converter 70 is a digitally controlled attenuator supplying voltages to the comparator 68 which are predetermined portions of a reference voltage applied to the input 71 of the converter 70.

Digital input information is supplied to the converter 70 from the logic unit 69 through a switch 72.

During the period of time that a single transducer is being sampled by the input switching mechanism, the logic unit 69 causes the digital-to-analog converter 70 to generate a sequence of voltages which are transmitted to the comparator 68. In the comparator, each of such voltages is compared with the output from the summing device 48 with the comparator giving indications to the logic unit of the results of such comparisons. When the proper voltages are generated, i.e., when the voltage from the converter 70 most nearly equals the signal voltage from the summing device 48, the sequence is stopped and the condition of the logic unit at this point corresponds to the proper digital output which is then supplied to the line 67. This type of analog-to-digital conversion is known in the art and will not be described in detail herein.

The digital output on the line 67 is coupled to one or more of a plurality of output devices, such as a typewriter 80, a card punch 81, a computer 82 and an alarm typewriter 83, through a switch 84 and switches 85, 86, 87 and 88. The input channel identification number is coupled from the number generator 25a to the switch 84 via line 91. Switch 84 is actuated by a timing unit 92 to send the channel identification number to the output devices following each operation of the input switching mechanism 10. The operation of switches 85, 86 and 87 is controlled from the program storage 21 which selects the output devices that are to receive the digital data from the line 67 and the identification number from the line 91. For example, the data from certain transducers may be typed while the data from other transducers may be punched on cards. Further, certain of the data may include the channel number and it may be omitted from other of the data.

The data handling system of the invention includes methods and apparatus for providing an indication when the measured output of a particular phenomenon exceeds a particular limit. This may include a high limit, a low limit or both and is sometimes referred to as an alarm system since it may be adapted to provide audible and/or visual indications when such limits have been exceeded. In one embodiment of the invention, the digital information which is being logged on typewriters is printed in a contrasting color when it is outside the pre-set limits. The out-of-limit data may also be logged on a separate output unit, as described below.

The alarm limits for each particular phenomenon being sensed by the transducers may be set in the program storage 21 or in the separate alarm memory 24 in digital form, using the units in which the phenomenon is being measured, such as pounds per square inch, feet per second and the like. The alarm system uses the digital-to-analog converter 70 and the comparator 68 of the analog-to-digital converter 14, the converter 70 being controlled from the program storage 21 through the switch 72. Alarm limit information is provided from the alarm memory 24 so that the converter 70 produces voltages corresponding to the predetermined limits for comparison with the voltage from the summing device 48. Alarm memory 24 may be any device that stores specific numbers and can reproduce these numbers upon selection of a specific input channel. The various storage devices described in the text "High Speed Computing Devices," supra, are suitable for use in this unit also. When both limits are being used, one limit voltage, say the high limit, will be generated by the converter 70 and the comparator will provide an indication if the signal voltage exceeds this limit voltage. Then a second limit voltage, the low limit, will be supplied by the converter to the comparator and the latter will produce an indication if the signal voltage is less than the low limit voltage. These indications from the comparator may be supplied to an alarm output line 75 for actuating the switch 88 so that the digital data will be logged on the alarm typewriter 83. The line 75 is also connected to the timing unit to insure actuation of the switch 84 so that the channel identification number will be fed to the alarm typewriter.

It should be realized that FIG. 1 is a single line schematic diagram of the data handling system of the invention and does not represent all of the interconnections between elements of the system. For example, if the digital-to-analog converter 70 was of the form of FIG. 2, each alarm limit would consist of eight pieces of information relating to the condition of each of the eight relays 36. Then the switch 72 would have eight switching paths so that all eight pieces of information could be transferred simultaneously to set the converter 70 to produce the desired voltage for use in the comparator 68.

The limit testing and the analog-to-digital conversion will be carried out during the interval of time that the input switching mechanism is coupled to a particular transducer and it is preferable to do the limit testing first so that the digital output may be handled in a special manner if a limit is exceeded.

The alarm memory 24 is a memory or information storage element similar to the program storage 21 and the former could be included in the latter if desired. However, it is usually more economical in equipment and set up time to provide separate units since each function being measured will ordinarily have a different limit while a plurality of transducers will have the same calibration. To illustrate, assume that the input signal sources include four identical strain gage transducers having identical gage factors, sensitivities and zero offsets. Further assume that the critical value of stress associated with each transducer is different. The alarm limits for each of the four transducers would be different while the program storage information associated with the A.C.-D.C. switch 23, the scaling amplifier 11 and the zero offset 12 would be identical. Hence, it is possible to effect considerable economy in the magnitude of the program storage required by having the program storage unit provide means for supplying an identical program for a plurality of inputs, while still permitting certain operation, viz the alarm limits, to be programmed on an individual basis for each signal source.

The automatic operation of such a data system requires in addition the control and timing unit 92 which causes the input switching mechanism 10 to switch automatically and which sequentially initiates operations and actuates the various units. In the system of FIG. 1, the advancements of the rotary stepping switch is controlled by pulses from the control and timing unit 92. Timing units are well known in the art, examples being shown in the following United States patents: "Timing Circuits," No. 2,782,256—Malthan; "Cathode-Ray Devices, Particularly for Electronic Computers," No. 2,750,532—Samuel; and "Quantizer," No. 2,733,431—Steele. Following a predetermined time interval after the switching step, which interval is provided to allow the amplifier and other components to stabilize following the selection of a new transducer, the control and timing unit provides a series of pulses or signals which selects the alarm operation in the analog-to-digital converter 14, causes the selected high alarm memory to transfer to the digital-to-analog converter 70, and samples the comparator output, then repeats the operation for the low alarm. If an alarm or off normal condition exists, the comparator causes the selection of the alarm read out by closing switch 88. Upon completion of alarm interrogation, the control and timing unit operates switches 72 and furnishes a train of pulses which sequences the analog-to-digital converter 70 through its digitization cycle. Upon completion of the analog-to-digital conversion cycle, the digital quantity is contained within the logic unit 69 and is available for transmission to various output devices. Depending upon the nature of these devices, viz, card punches, visual read outs, computers, etc., the control and timing unit then provides a train of pulses for selectively transferring either or both the output from the logic unit and the channel or transducer identification number to the appropriate output devices.

The control and timing unit will sequentially select the digital information from the channel number generator 25a and the analog-to-digital converter 14 and will in conjunction with the information contained in the program storage 21 distribute the digital data as directed. Note that each read out device is individually controlled for each output word, viz, data or channel number. Thus the program storage can indicate that the typewriter and computer are to receive a particular data word and that the card punch receives the same data word and the channel identification number. If a particular transducer output exceeds the alarm limits then the alarm typewriter is selected and it will automatically receive both the identification number and the data word. Upon completion of the information transfer to the output equipment, the control and timing unit initiates a pulse which causes the input switching mechanism 10 to advance to its next position and the cycle is repeated.

Table I indicates a typical sequence for performing the operations of a single cycle under the control of the control and timing unit 92 in a system providing a four digit output.

I

| Time Period: | Operations |
|---|---|
| $t_1$ | None—permits amplifier and switching transient decay. |
| $t_2$ | Alarm limits and analog-to-digital conversion cycle. |
| $t_3$ | Select output devices to receive identification number. |
| $t_4$ | Select color for printing, space and tabulate logging devices as required. |
| $t_5$, $t_6$, $t_7$ | Transfer three digit identification number to selected output devices. |
| $t_8$ | Select output devices to receive data word. |
| $t_9$ | Select color for printing, space and tabulate logging devices as required. |
| $t_{10}$, $t_{11}$, $t_{12}$, $t_{13}$ | Transfer four digit data word from logic to output devices. |
| $t_{14}$ | Carriage returns, card feeds, interrecord gaps, etc, as required. |
| $t_{15}$ | Advance input switching mechanism. |

During the period $t_3$–$t_{14}$, the A.C.-D.C. switch, the scale factor $a$ and the zero offset $b$ for the next input channel will be set from the program storage. The time intervals of Table I are not necessarily equal and similar operating cycles exist within some of the indicated time periods. For example, Table II indicates a typical sequence of operations carried out during the period $t_2$.

II

| Time Period: | Operations |
|---|---|
| $t_{21}$ | Transfer high alarm limit and make comparison. |
| $t_{22}$ | Transfer low alarm limit and make comparison. |
| $t_{23}$ | Try 8000 digit of digital-to-analog converter 70 in comparator. |
| $t_{24}$ | Try 4000 digit. |
| * | * |
| $t_{218}$ | Try units digit. |

If, in each operation during periods $t_{23}$–$t_{218}$, the comparator indicates that the output of the digitally controlled attenuator is greater than the input signal, the logic rejects the digit which was tried and tries the next smaller digital value.

The operation of such a data handling system is entirely automatic once the operating information has been set in the program storage. The various transducers are connected to the signal input terminals, the sequence in which the signal input terminals are to be sampled by the switching mechanism is set, the various parameters for each input signal are set in the program storage and the alarm memory and the system is ready to operate. The parameters to be set include the type of signal received from the transducer, i.e., A.-C. or D.-C., the scale factor for the transducer corresponding to the gain $a$ of the amplifier, the zero offset $b$, if any, alarm limits, and the disposition of information to output devices. The size and speed of operation of a particular data handling system are dependent upon the application which is being made of the system. Systems are currently being provided having as high as five hundred input-terminals which are sampled at a rate of five terminals per second with a zero offset of plus or minus ten thousand digits and an output of plus or minus ten thousand digits full scale.

Although an exemplary embodiment of the invention has been disclosed and discussed, it will be under stood that other applications of the invention are possible and that the embodiment disclosed may be subjected to various changes, modifications and substitutions without necessarily departing from the spirit of the invention.

We claim as our invention:

1. In a data handling system for collecting signals from a plurality of sources, modifying the signals and transmitting the signals through a single output, the combination of: a plurality of signal inputs; amplifier means having a variable gain; switching means for coupling each of said signal inputs to said amplifier means singly and in signal transmitting relation; control means for controlling the gain of said amplifier means; information storage means; circuit means coupling said information storage means to said control means; and circuit means coupling said switching means to said information storage means for directing specific stored information to be transmitted to said control means from said information storage means for varying the gain of said amplifier means as a function of the particular signal input coupled to said amplifier means.

2. In a data handling system for collecting signals from a plurality of sources, modifying the signals and transmitting the signals through a single output, the combination of: a plurality of signal inputs; amplifier means having a variable gain; switching means for coupling each of said signal inputs to said amplifier means singly and in signal transmitting relation; control means for controlling the gain of said amplifier means as a function of information transmitted to said control means; information storage means; signal generator means for generating a signal voltage of a particular magnitude; adder means for adding said signal voltage to the output of said amplifier means; circuit means coupling said information storage means to said control means and to said signal generator means; and circuit means coupling said switching means to said information storage means for directing specific stored information to be transmitted to said control means and to said signal generator means from said information storage means for varying the gain of said amplifier means and for controlling the magnitude of said signal voltage as a function of the particular signal input coupled to said amplifier means.

3. A data handling system as defined in claim 2 including an analog-to-digital converter coupled to the output of said adder means for converting signals which have been coupled to said signal inputs to digital form.

4. In a data handling system for collecting signals from a plurality of sources, modifying the signals and transmitting the signals through a single output, the combination of: a plurality of signal inputs; amplifier means having a variable gain; switching means for coupling each of said signal inputs to said amplifier means singly and in signal transmitting relation; control means for controlling the gain of said amplifier means as a function of information transmitted to said control means; information storage means; signal generator means for generating a limit voltage of a particular magnitude; comparator means for comparing first and second voltages and producing an indication when the first exceeds the second; circuit means coupling the output of said amplifier means and said limit voltage to said comparator means as said first and second voltages respectively; circuit means coupling said information storage means to said control means and to said signal generator means; and circuit means coupling said switching means to said information storage means for directing specific stored information to be transmitted to said control means and to said signal generator means from said information storage means for varying the gain of said amplifier means and for controlling the magnitudes of said limit voltages as a function of the particular signal input coupled to said amplifier means.

5. In a data handling system for collecting signals from a plurality of sources, modifying the signals and transmitting the signals through a single output, the combination of: a plurality of signal inputs; amplifier means having a variable gain; switching means for coupling each of said signal inputs to said amplifier means singly and in signal transmitting relation; control means for controlling the gain of said amplifier means as a function of information transmitted to said control means; information storage means; signal generator means for receiving information from said storage means and sequentially generating an upper limit voltage and a lower limit voltage of particular magnitudes; comparator means for comparing first and second voltages at intervals and, on a first comparison, producing an indication when the first exceeds the second and, on a second comparison, producing an indication when the second exceeds the first; circuit means coupling the outputs of said amplifier means and said signal generator means to said comparator means as said first and second voltages respectively; circuit means coupling said information storage means to said control means and to said signal generator means; and circuit means coupling said switching means to said information storage means for directing specific stored information to be transmitted to said control means and to said signal generator means from said information storage means for varying the gain of said amplifier means and for controlling the magnitude of said limit voltages as a function of the particular signal input coupled to said amplifier means.

6. In a data handling system for collecting signals from a plurality of sources, modifying the signals and transmitting the signals through a single output, the combination of: a plurality of signal inputs; amplifier means having a variable gain; switching means for coupling each of said signal inputs to said amplifier means singly and in signal transmitting relation; amplifier control means for controlling the gain of said amplifier means as a function of information transmitted to said amplifier control means; information storage means; signal generator means for generating a signal voltage of a particular magnitude; adder means for adding said signal voltage to the output of the amplifier means; an analog-to-digital converter coupled to the output of said adder means for converting signals which have been coupled to said signal inputs to digital form, said analog-to-digital converter including a reference voltage source, a comparator, a digital-to-analog converter for supplying comparison voltages to said comparator, a digital-to-analog converter control means, and a logic circuit actuated by the output of said comparator for supplying control information to said converter control means; circuit means coupling said information storage means to said amplifier control means, to said signal generator means and to said converter control means; circuit means coupling said switching means to said information storage means for directing specific stored information to be transmitted to said amplifier control means, to said signal generator means and to said converter control means from said information storage means for varying the gain of said amplifier means, for controlling the magnitude of said signal voltage and for providing limit information to said converter control means as a function of the particular signal input coupled to said amplifier means; and means for actuating said converter control means to sequentially couple said limit information and said control information to said digital-to-analog converter during the period when a particular signal input is coupled to said amplifier means.

7. In an apparatus for receiving a plurality of signals which may exist simultaneously in analog form, modifying the signals and transmitting the signals singly to an output, the combination of: a plurality of signal inputs; feed-back amplifier means; a digitally controlled attenuator coupled in the feed-back loop of said amplifier means; storage means for storing information in digital form; switching means for coupling each of said signal inputs to said amplifier means singly and in signal transmitting relation; circuit means coupling said storage means to said attenuator; and control means for actuating said switching means in a predetermined sequence and for energizing said storage means to feed out predetermined digital information to said attenuator while a particular signal input is coupled to said amplifier means by said switching means.

8. In an apparatus for receving a plurality of signals which may exist simultaneously in analog form, modifying the signals and transmitting the signals singly to an output, the combination of: a plurality of signal inputs; feed-back amplifier means; a first digitally controlled attenuator coupled in the feed-back loop of said amplifier means; storage means for storing information in digital form; switching means for coupling each of said signal inputs to said amplifier means singly and in signal transmitting relation; a voltage adding circuit having at least two inputs and an output, the output of said amplifier means being coupled to one of said adding circuit inputs; a reference voltage source; a second digitally controlled attenuator coupling said reference voltage source to a second of said inputs of said adding circuit; circuit means coupling said storage means to each of said attenuators; and control means for actuating said switching means in a predetermined sequence and for energizing said storage means to feed out predetermined digital information to each of said attenuators while a particular signal input is coupled to said amplifier means by said switching means.

9. In an apparatus for receiving a plurality of signals which may exist simultaneously in analog form, modifying the signals and transmitting the signals singly to an output, the combination of: a plurality of signal inputs; feed-back amplifier means; a first digitally controlled attenuator coupled in the feed-back loop of said amplifier means; storage means for storing information in digital form; switching means for coupling each of said signal inputs to said amplifier means singly and in signal transmitting relation; a voltage adding circuit having at least two inputs and an output, the output of said amplifier means being coupled to one of said adding circuit inputs; a reference voltage source; a second digitally controlled attenuator coupling said reference voltage source to a second of said inputs of said adding circuit; an analog-to-digital converter; circuit means coupling said output of said adding circuit to said analog-to-digital converter in signal transmitting relation; circuit means coupling said storage means to each of said attenuators; and control means for actuating said switching means in a predetermined sequence and for energizing said storage means to feed out predetermined digital information to each of said attenuators while a particular signal input is coupled to said amplifier means by said switching means.

10. In a circuit for operating on $n$ analog signals $x_1$ to $x_n$, each of which may be continuous, to provide discreetly spaced output in the form of $y_m = a_m x_m + b_m$, where $m = 1, 2, \ldots n$, the combination of: $n$ signal input terminals; a memory for storing predetermined values of $a_1$ to $a_n$ and $b_1$ to $b_n$ in digital form; an amplifier having gain $a$, said amplifier including a digitally controlled attenuator for varying said gain; a voltage source having output $b$, said voltage source including a digitally controlled attenuator for varying the magnitude of said output; circuit means for coupling the outputs of said amplifier and said voltage source together in additive relation; circuit means for coupling said memory to each of said attenuators in controlling relation; switching means for coupling said input terminals to said amplifier in signal transmitting relation singly and in a predetermined sequence; and circuit means interconnecting said switching means and said memory for feeding out $a_m$ and $b_m$ from said memory to said attenuators respectively when the $n$th terminal is coupled to said amplifier by said switching means.

11. In a system for handling a plurality of data inputs in analog form, the combination of: switching means for sampling each of the inputs in a predetermined sequence; amplifier means for changing by a predetermined factor the magnitude of a data input sample coupled thereto by said switching means; a program storage for presetting of said predetermined factor; and circuit means coupling said storage to said switching means and to said amplifier means for operation of said amplifier means at said predetermined factor as a data input is being sampled by said switching means.

12. In a system for handling a plurality of data inputs in analog form, the combination of: switching means for sampling each of the inputs in a predetermined sequence; amplifier means for changing by a predetermined factor the magnitude of a data input sample coupled thereto by said switching means; a program storage for presetting of said predetermined factor; circuit means coupling said storage to said switching means and to said amplifier means for operation of said amplifier means at said predetermined factor as a data input is being sampled by said switching means; and an analog-to-digital converter for converting the amplified input data to digital form.

13. In a system for converting input analog signals to digital output signals having an analog-to-digital converter, said converter including a comparator and a digital-to-analog converter, means connecting said digital-to-analog converter to said comparator for supplying a sequence of voltages thereto, and means connecting said input analog voltages to said comparator whereby the desired digital output signals are generated; the improvement which comprises storage means for storing a predetermined voltage limit in digital form, and means for selectively connecting said storage means to the digital-to-analog converter of said analog-to-digital converter for producing an output analog voltage corresponding to said predetermined voltage limit, said output analog voltage being compared with said input analog signals in said comparator of said analog-to-digital converter, the output of said comparator providing an indication when the input analog signals exceed the predetermined limit.

References Cited in the file of this patent
UNITED STATES PATENTS

| | | |
|---|---|---|
| 2,736,006 | Langenin et al. | Feb. 21, 1956 |
| 2,781,970 | Kaufman | Feb. 19, 1957 |

OTHER REFERENCES

IRE National Convention (part 7) (Packer) 1953, p. 19.

Data-Handling for General Instrumentation (Frank) Proc. of Nat. Electric Conf., February 1954, pages 645–655.

High-Speed Digital Conversion (Klein et al.) Digital Automation, July 1956, pages 1297–1302.